United States Patent
Tandon et al.

(10) Patent No.: US 11,792,119 B2
(45) Date of Patent: Oct. 17, 2023

(54) MULTI-PROTOCOL SERVICE CHAINING AMONG DEVICES OF INTERCONNECTED TOPOLOGY

(71) Applicant: Juniper Networks, Inc., Sunnyvale, CA (US)

(72) Inventors: Ankur Tandon, Sunnyvale, CA (US); Vivekananda Shenoy, Singapore (SG); Jacopo Pianigiani, Cupertino, CA (US); Abhinav Pandit, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/247,900

(22) Filed: Dec. 29, 2020

(65) Prior Publication Data

US 2021/0144087 A1 May 13, 2021

Related U.S. Application Data

(63) Continuation-in-part of application No. 16/235,993, filed on Dec. 28, 2018, now Pat. No. 10,897,420.
(Continued)

(51) Int. Cl.
*H04L 41/22* (2022.01)
*H04L 67/1014* (2022.01)
(Continued)

(52) U.S. Cl.
CPC ............ *H04L 45/42* (2013.01); *H04L 41/22* (2013.01); *H04L 45/586* (2013.01); *H04L 67/1014* (2013.01)

(58) Field of Classification Search
None
See application file for complete search history.

(56) References Cited

U.S. PATENT DOCUMENTS

| 9,571,394 | B1 | 2/2017 | Sivaramakrishnan et al. |
| 9,998,324 | B2 | 6/2018 | Chanda et al. |

(Continued)

FOREIGN PATENT DOCUMENTS

| EP | 2882151 B1 | 2/2017 |
| WO | 2013184846 A1 | 12/2013 |

OTHER PUBLICATIONS

Title: Configuring Bridging in AOS Date: Dec. 2009 Publisher: ADTRAN Inc. (Year: 2009).*

(Continued)

*Primary Examiner* — John A Follansbee
*Assistant Examiner* — Kamal M Hossain
(74) *Attorney, Agent, or Firm* — Harrity & Harrity, LLP

(57) ABSTRACT

Virtual network controllers are described that automatically generate policies and configuration data for routing traffic through physical network function (PNF) service chains in a multi-tenant data center. An example network controller includes a memory and processing circuitry configured to: automatically generate, for one or more integrated routing and bridging (IRB) units of corresponding virtual network forwarding tables of a switch of a switch fabric of a data center network, configuration information that, when deployed, causes the IRB units to direct data traffic conforming to multiple communication protocols and flowing over a plurality of virtual networks between a first set of server devices and a second set of server devices positioned outside of the switch fabric (i) toward a service device logically positioned outside of the switch fabric and coupled to the switch, and (ii) back from the service device into the switch fabric via the switch.

20 Claims, 10 Drawing Sheets

Related U.S. Application Data

(60) Provisional application No. 63/030,665, filed on May 27, 2020.

(51) Int. Cl.

| | | |
|---|---|---|
| *H04L 45/42* | (2022.01) | |
| *H04L 45/586* | (2022.01) | |
| *H04L 41/08* | (2022.01) | |
| *H04L 9/40* | (2022.01) | |
| *H04L 12/46* | (2006.01) | |
| *H04L 41/0806* | (2022.01) | |
| *H04L 45/00* | (2022.01) | |
| *H04L 49/1515* | (2022.01) | |

(56) References Cited

U.S. PATENT DOCUMENTS

| | | | |
|---|---|---|---|
| 10,355,989 B1 | 7/2019 | Panchal et al. | |
| 10,992,576 B1* | 4/2021 | Panchal | H04L 45/64 |
| 2014/0269733 A1* | 9/2014 | Venkatesh | H04L 49/356 |
| | | | 370/395.53 |
| 2014/0307744 A1 | 10/2014 | Dunbar et al. | |
| 2015/0063102 A1 | 3/2015 | Mestery et al. | |
| 2016/0277210 A1* | 9/2016 | Lin | H04L 45/16 |
| 2016/0330125 A1 | 11/2016 | Mekkattuparamban et al. | |
| 2017/0195210 A1* | 7/2017 | Jacob | H04L 45/02 |
| 2017/0324660 A1 | 11/2017 | Sinha et al. | |
| 2018/0159957 A1 | 6/2018 | Hooda et al. | |
| 2018/0309632 A1 | 10/2018 | Kompella et al. | |
| 2018/0331951 A1* | 11/2018 | Boutros | H04L 41/0895 |
| 2018/0359323 A1 | 12/2018 | Madden | |
| 2018/0375765 A1 | 12/2018 | Osborne | |
| 2019/0141010 A1 | 5/2019 | Chander et al. | |
| 2020/0059459 A1 | 2/2020 | Abraham et al. | |
| 2020/0322268 A1* | 10/2020 | Thoria | H04L 45/64 |

OTHER PUBLICATIONS

"contrail-specs/5.1/cfm-le-pnf-support.md," available at: github.com/Juniper/contrail-specs/blob/master/5.1/cfm-I3-pnf-support.md, Nov. 12, 2018, 8 pp.

Fernando et al., "Service Chaining using Virtual Networks with BGP," draft-fm-bess-service-chaining-00, Internet Draft, Jul. 5, 2015, 32 pp.

"OpenFlow Switch Specification," Version 1.1.0 Implemented (Wire Protocol 0x02), Open Networking Foundation, Feb. 28, 2011, 58 pp.

Jiang et al., "Translating High-Level Configuration Instructions to Low-Level Device Configuration," U.S. Appl. No. 15/198,657, filed Jun. 30, 2016.

U.S. Appl. No. 16/235,993 entitled "Service Chaining Among Devices of Interconnected Topology", Juniper Networks, Inc. (inventor: Pianigiani) filed Dec. 28, 2018.

Executive, "Juniper Networks EVPN Implementation for Next-Generation Data Center Architectures; Using Ethernet VPN to Address Evolving Data Center Requirements", White Paper, Jul. 31, 2015, 62 pp. XP055367919, Retrieved from the Internet: URL:https://www.juniper.net/assets/us/en/local/pdf/whitepapers/2000606-en.pdf.

Extended Search Report from counterpart European Application No. 21163257.5 dated Sep. 28, 2021, 12 pp.

Singla et al., "OpenContrail Architecture Documentation", Feb. 8, 2014, 39 pp. XP055204674, retrieved from the Internet: URL:http://web.archive.org/web/20140208021157/http://opencontrail.org/opencontrail-architecture-documentation/.

* cited by examiner

| Search | Logical Router   Tags   Permissions |
|---|---|
| ⭐ FAVORITES ⌄ | |
| MONITORING ⌄ | Name* ⓘ |
| INFRASTRUCTURE ⌄ | [LRx] |
| OVERLAY ⌄ | Admin State ⓘ<br>● Up  ○ Down |
| WORKLOADS ⌄ | Logical Router Type ⓘ |
| IAM ⌄ | [VXLAN Routing ⌄] |
| SERVICES ⌄ | Choose Fabric*<br>[test ⌄] |
| SECURITY ⌄ | Connected networks ⓘ |
| DEBUG ⌄ | [R OSPF-10.0.0.0 ˣ] [BD-4020 ˣ] [BD-4021 ˣ]<br>[BD-4022 ˣ] [R OSPF-10.0.0.4 ˣ]<br>[L test-overlay-loopback-network ˣ] ⌄ |
| DNS ⌄ | Extend to Physical Router* ⓘ |
| QUERY ⌄ | [5a12-qfx5 ˣ] ⌄ |
| | ☐ Public Logical Router ⓘ<br>☑ NAT<br>VxLAN Network Identifier |
| | [1-16777215] |

Reconfigure Physical Routers

Sidebar (left):
- Search
- ☆ FAVORITES ∧
- MONITORING ∧
- INFRASTRUCTURE ∧
- OVERLAY ∧
- WORKLOADS ∧
- IAM ∧
- SERVICES ∧
- SECURITY ∧
- DEBUG ∧
- DNS ∧
- QUERY ∧

Form:

Routed Virtual Network*
[test-overlay-loopback-... ▾]

Loopback IP Address
[8.8.8.8]

Routing Protocol*
[eBGP ▾]

Local ASN ⓘ
[Enter Local ASN]

Peer ASN*
[12345]

Peer IP*
[10.10.10.1]

Import Route Policies
[ ▾ ]

Export Route Policies
[OSPF-2-BGP ✕ ▾]

md5 Authentication Key (optional)
[test123]

☐ BFD ⓘ  ☑ MultiHop Options

Time To Live
[10]

+Add

[Cancel] [Submit]

MULTI-PROTOCOL SERVICE CHAINING AMONG DEVICES OF INTERCONNECTED TOPOLOGY

This application claims the benefit of U.S. Provisional Application No. 63/030,665, filed 27 May 2020 and is a continuation-in-part of U.S. patent application Ser. No. 16/235,993 filed on 28 Dec. 2018, the entire content of which are incorporated herein by reference.

TECHNICAL FIELD

This disclosure relates to computer networks.

BACKGROUND

Packet forwarding devices of data centers (e.g., routers & switches) forming the switch fabric of the data center are often arranged according to an interconnected topology, such as an Internet protocol Clos (IP-Clos) network. Data centers provide services for multiple tenants, and generally provide tenant isolation to prevent data of one tenant from being accessible to other tenants. For example, an IP-Clos packet switching network of the data center may be configured according to Ethernet VPN Virtual Extensible LAN (EVPN VxLAN) where network traffic associated with each tenant of the data center traverses a separate virtual network.

SUMMARY

In general, this disclosure describes techniques that enable a virtual network controller to automatically generate policies and configuration data for routing traffic through physical network function (PNF) service chains in a multi-tenant data center. That is, some devices of a data center may be deployed to provide physical network functions (PNFs), such as network security operations. As described herein, the techniques allow PNFs to be provisioned within a data center switch fabric for inter-tenant communication without requiring manual configuration of device-specific and/or vendor-specific configuration procedures. In particular, this disclosure describes techniques for automating configuration and architecture of network devices in the data center to provide PNFs in the forwarding path across tenants of the data center. These techniques may simplify the architecture of devices and the network of the data center, as it may extend constructs and configurations already widely used in data center IP-Clos networks using, e.g., Ethernet VPN Virtual Extensible LAN (EVPN VxLAN), to apply for inter-tenant service chaining through any generic PNF. This architecture also allows a software defined network (SDN) controller to automate the configuration of inter-tenant service chaining, without requiring any manual intervention, e.g., manual entry of commands via command line interface (CLI).

The techniques of this disclosure may thereby offer various benefits. For example, these techniques can automate configuration while leveraging open and widely adopted standards, such as EVPN VxLAN constructs and capabilities. These techniques may also be applied to any type of PNF. These techniques may natively support PNF multi-homing on multiple devices, allowing for scaling and redundancy of services a PNF delivers. These techniques also support PNF high availability.

In one example, this disclosure describes a method that includes automatically generating, by a virtual network controller device of a data center network, for one or more integrated routing and bridging (IRB) units of corresponding virtual network forwarding tables of a switch of a switch fabric of the data center, configuration information that, when deployed, causes the IRB units to direct data traffic conforming to multiple communication protocols and flowing over a plurality of virtual networks between a first set of server devices and a second set of server devices positioned outside of the switch fabric (i) toward a service device logically positioned outside of the switch fabric and coupled to the switch, and (ii) back from the service device into the switch fabric via the switch; and deploying, by the virtual network controller device, the configuration information to configure the one or more IRB units of the corresponding forwarding tables of the switch according to the automatically generated configuration information.

In another example, this disclosure describes a network controller that includes a memory and process circuitry configured to: automatically generate, by the virtual network controller device, one or more integrated routing and bridging (IRB) units of corresponding virtual network forwarding tables of a switch of a switch fabric of a data center network, configuration information that, when deployed, causes the IRB units to direct data traffic conforming to multiple communication protocols and flowing over a plurality of virtual networks between a first set of server devices and a second set of server devices positioned outside of the switch fabric (i) toward a service device logically positioned outside of the switch fabric and coupled to the switch, and (ii) back from the service device into the switch fabric via the switch; and deploy, by the virtual network controller device, the configuration information to configure the one or more IRB units of the corresponding forwarding tables of the switch according to the automatically generated configuration information.

In another example, this disclosure describes a computer-readable storage medium that includes automatically generating, by a virtual network controller device of a data center network, for one or more integrated routing and bridging (IRB) units of corresponding virtual network forwarding tables of a switch of a switch fabric of the data center, configuration information that, when deployed, causes the IRB units to direct data traffic conforming to multiple communication protocols and flowing over a plurality of virtual networks between a first set of server devices and a second set of server devices positioned outside of the switch fabric (i) toward a service device logically positioned outside of the switch fabric and coupled to the switch, and (ii) back from the service device into the switch fabric via the switch; and deploy, by the virtual network controller device, the configuration information to configure the one or more IRB units of the corresponding forwarding tables of the switch according to the automatically generated configuration information.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a screenshot illustrating a UI-based functionality enabling default internally routed virtual network creation when a LR loopback subnet is defined.

FIG. 6 is a screenshot illustrating an example of LR loopback functionalities provided via the interactive GUIs of this disclosure.

DETAILED DESCRIPTION

Figure 1:
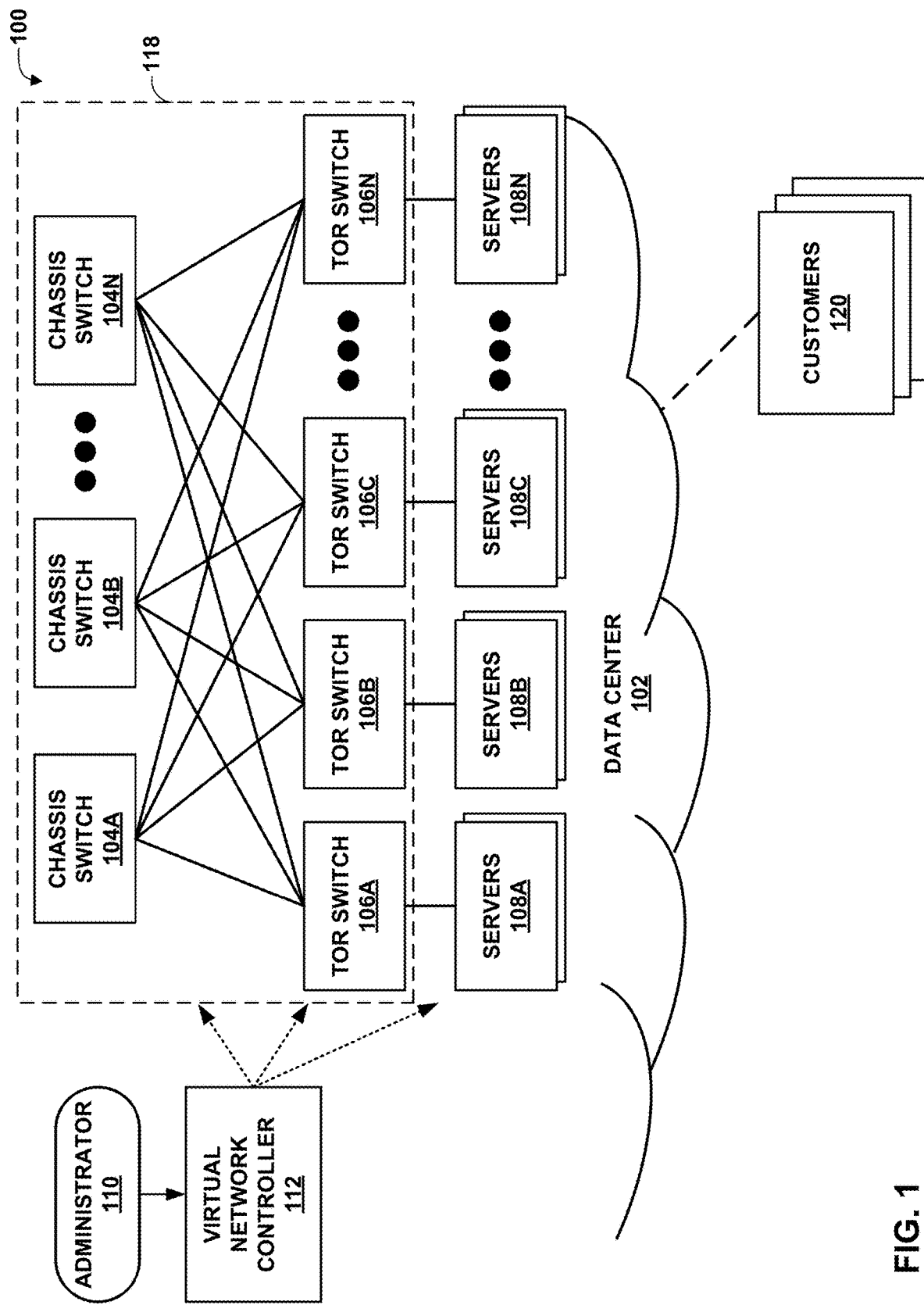
FIG. 1 is a block diagram illustrating an example network including a data center in which examples of the techniques described herein may be implemented.

FIG. 1 is a block diagram illustrating an example network 100 including a data center 102 in which examples of the techniques described herein may be implemented. In general, data center 102 provides an operating environment for applications and services for customers 120 coupled to the data center, e.g., by a service provider network (not shown). Data center 102 may, for example, host infrastructure equipment, such as networking and storage systems, redundant power supplies, and environmental controls. A service provider network that couples customers 120 to data center 102 may be coupled to one or more networks administered by other providers, and may thus form part of a large-scale public network infrastructure, e.g., the Internet.

In some examples, data center 102 represents one of many geographically distributed network data centers. As illustrated in the examples of FIG. 1, data center 102 may be a facility that provides network services for customers 120. Customers 120 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 102 may be individual network servers, network peers, or otherwise.

In this example, data center 102 includes a set of storage systems and application servers 108A-108N (servers 108) interconnected via interconnected topology 118, which may comprise a switch fabric provided by one or more tiers of physical network switches and routers. Servers 108 may be respective bare metal servers (BMSs). In the examples of FIG. 1, interconnected topology 118 includes chassis switches 104A-104N (chassis switches 104) and top-of-rack (TOR) switches 106A-106N (TOR switches 106). For instance, chassis switches 104 may form spine nodes of a spine and leaf topology, while TOR switches 106 may form leaf nodes of the spine and leaf topology. It should be understood that other topologies may be used in other examples, as discussed in greater detail below. Servers 108 provide execution and storage environments for applications and data associated with customers 120 and may be physical servers, virtual machines or combinations thereof.

In general, interconnected topology 118 represents layer two (L2) and (in some examples) layer three (L3) switching and routing components that provide point-to-point connectivity between servers 108. In one example, interconnected topology 118 comprises a set of interconnected, high-performance yet off-the-shelf packet-based routers and switches that implement industry standard protocols. In one example, interconnected topology 118 may comprise off-the-shelf components that provide Internet Protocol (IP) over an Ethernet (IPoE) point-to-point connectivity.

In FIG. 1, virtual network controller 112 provides a high-level controller for configuring and managing routing and switching infrastructure of data center 102. Example details of virtual network controller 112 operating in conjunction with other devices of network 100 or other software-defined networks can be found in International Application Number PCT/US2013/044378 filed on 6 May 2013 and in U.S. patent application Ser. No. 14/226,509 filed on 26 Mar. 2014 (now issued as granted U.S. Pat. No. 9,571, 394), the entire contents of each of which are incorporated by reference.

Virtual network controller 112 may represent, for example, a software-defined network (SDN) controller that communicates and manages the devices of data center 102 using an SDN protocol, such as the OpenFlow protocol. Additional details regarding OpenFlow are found in "OpenFlow Switch Specification version 1.1.0", OpenFlow Consortium, February 2011, the entirety of which is incorporated by reference herein. In addition, virtual network controller 112 may communicate with the routing and switching infrastructure of data center 102 using other interface types, such as a Simple Network Management Protocol (SNMP) interface, a path computation element protocol (PCEP) interface, a Device Management Interface (DMI), a CLI, an Interface to the Routing System (IRS), or any other node configuration interface.

Virtual network controller 112 provides a logically—and in some cases, physically—centralized controller for facilitating operation of one or more virtual networks within data center 102 in accordance with examples of this disclosure. In some examples, virtual network controller 112 may operate according to configuration input received from network administrator 110. Additional information regarding virtual network controller 112 operating in conjunction with other devices of data center 102 can be found in International Application Number PCT/US2013/044378 filed on 5 Jun. 2013, entitled PHYSICAL PATH DETERMINATION FOR VIRTUAL NETWORK PACKET FLOWS, there entire content of which is hereby incorporated by reference.

Although not shown in FIG. 1, data center 102 may also include one or more additional switches, routers, hubs, gateways, security devices such as firewalls, intrusion detection, and/or intrusion prevention devices, computer terminals, laptops, printers, databases, wireless mobile devices such as cellular phones or personal digital assistants, wireless access points, bridges, cable modems, application accelerators, or other network devices. In general, network traffic within interconnected topology 118, such as packet flows between servers 108, can traverse the physical network of interconnected topology 118 using many different physical paths. For example, a "packet flow" can be defined by values used in a header of a packet, such as the network "five-tuple," i.e., a source IP address, destination IP address, source port and destination port that are used to route packets through the physical network, and a communication protocol. For example, the protocol element of the 5-tuple specifies the communications protocol, such as TCP or UDP, and the Source port and Destination port elements refer, respectively, to source and destination ports of the connection.

A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may represent a set of all PDUs transmitted in a Transmission Control Protocol (TCP) connection, a set of all PDUs sourced by a particular MAC address or IP address, a set of all PDUs having the same VLAN tag, or a set of all PDUs received at the same switch port.

As shown in the examples of FIG. 1, each of TOR switches 106 is communicatively coupled to each of chassis switches 104 in interconnected topology 118. Similarly, in this example, each of chassis switches 104 is communicatively coupled to each of TOR switches 106. TOR switches 106 and chassis switches 104 are described herein as physical devices that collectively form a "switch fabric" for data center 102, i.e., interconnected topology 118 of routing/switching network devices. Accordingly, the number of paths from any one of TOR switches 106 to any other one of TOR switches 106 is equal to the number of chassis switches 104, in this example. Although the letter "N" is used to represent undefined numbers of both TOR switches 106 and chassis switches 104, it should be understood that there may be a different number of TOR switches 106 than chassis switches 104.

Servers 108 may correspond to respective tenants of data center 102. For example, servers 108A may correspond to a first tenant, servers 108B may correspond to a second tenant, and so on. Interconnected topology 118 allows for inter-tenant communication, e.g., between servers 108A-108N. In accordance with the techniques of this disclosure, virtual network controller 112 may be configured to automatically configure one or more service devices to provide physical network functions (PNFs) to inter-tenant communications. The service devices may be, for example, TOR switches 106, chassis switches 104, or other devices connected thereto. In general, the service devices may be any International Organization for Standardization (ISO) Open Systems Interconnection (OSI) model Layer 3 Virtual Extensible LAN (VxLAN) Network Identifier (VNI) capable devices, which may be configured in active-active mode.

Interconnected topology 118 may be implemented in various ways, and does not necessarily include the devices or arrangement shown in FIG. 1. In one example, interconnected topology 118 is implemented as a spine and leaf topology. In such an example, chassis switches 104 are configured as spine switches (e.g., Layer 3 switches) and TOR switches 106 are configured as leaf switches.

Figure 2:
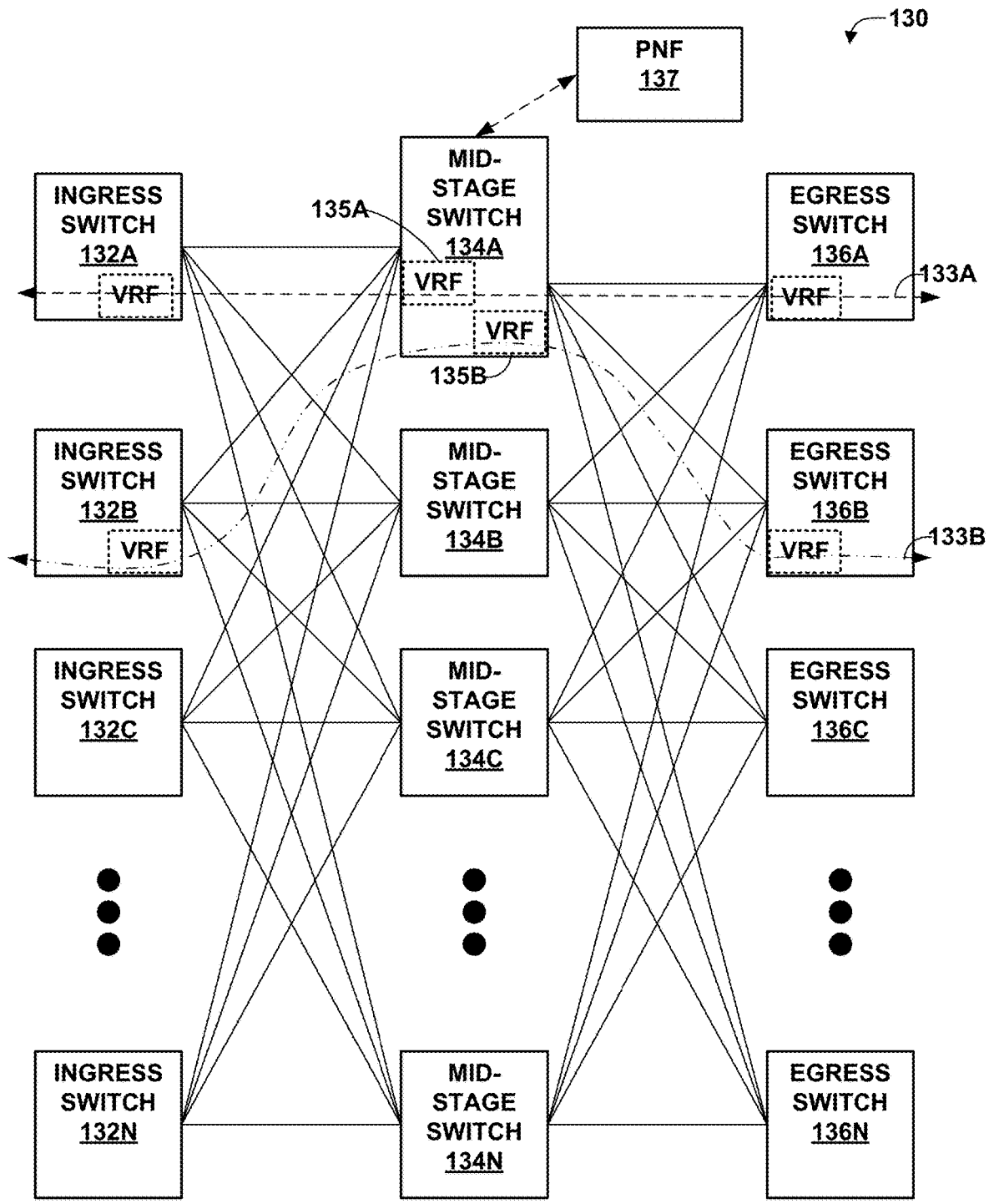
FIG. 2 is a block diagram illustrating an example Clos network.

In another example, interconnected topology 118 is implemented as a Clos network with three or more stages. A spine and leaf network is functionally similar to a three-stage Clos network, and therefore, spine and leaf networks are sometimes referred to as folded three-stage Clos networks. In general, Clos networks include three or more stages: an ingress stage, one or more mid-stages, and an egress stage. Nodes of each stage are connected to each node of each neighboring stage. For example, each node of the ingress stage is connected to each node of the first mid-stage, and each node of the last mid-stage (which is also the first mid-stage in a three-stage Clos network) is connected to each node of the egress stage. An example Clos network is shown in FIG. 2, as discussed in greater detail below.

In another example, interconnected topology 118 is implemented as a Virtual Chassis Fabric (VCF), e.g., as explained in Yafan An, "Tiers in Virtual Chassis Fabric," 30 Oct. 2013 available at http://forums.juniper.net/t5/Data-Center-Technologists/Tiers-in-Virtual-Chassis-Fabric/ba-p/214765. A VCF allows interconnected topology 118 to be managed as a single device, e.g., by virtual network controller 112. One example VCF implementation may be realized using four QFX5100-24Q switches from Juniper Networks, Inc., Sunnyvale, Calif. as spine switches and sixteen QFX5100-48S switches from Juniper Networks, Inc., Sunnyvale, Calif. as leaf switches. In this example, the spine switches support 48×10 Gigabit Ethernet (GbE) and 6×40 GbE interfaces, while each leaf switch uses 4×40 GbE interfaces as uplinks to the spine switches. This creates an oversubscription of 480:160 or 3:1 per leaf switch, in this particular example. Each leaf switch supports 48×10 GbE interfaces, such that the total port count is 768×10 GbE with 3:1 oversubscription.

In another example, interconnected topology 118 is implemented as an Internet protocol (IP) Fabric. An IP Fabric is made up of routing devices implementing a Border Gateway Protocol (BGP), and each of the routing devices is a BGP neighbor to each of the other devices in the IP Fabric. An example IP Fabric can be formed from four Juniper Networks QFX5100-24Q switches as spine switches and QFX5100-96S switches, available from Juniper Networks, Inc., Sunnyvale, Calif., as leaf switches. Such an arrangement results in an IP Fabric of 3072×10 GbE usable ports. As an example, the leaf switches are constructed using the QFX5100-96S, and 8×40 GbE interfaces are used as uplinks into the spine, in this example. Because each leaf switch in this example has eight uplinks into the spine, the maximum width of the overall spine is eight in this example. Each 40 GbE interface per leaf switch connects to a separate spine switch—thus, each leaf switch consumes one 40 GbE interface per spine switch. To calculate the maximum size of the IP Fabric, the number of server interfaces is multiplied by the number of leaf switches supported by the spine.

In yet another example, rather than interconnected topology 118 of FIG. 1, servers 108 may be connected by an interconnected topology according to IEEE 802.1BR. In accordance with IEE 802.1BR, interconnected topology 118 may instead include two spine switches, multiple leaf switches, and two or more satellite switches, such that there are two or more paths from any satellite switch to any other satellite switch. For example, in accordance with IEEE 802.1BR, there may be two controlling bridges in the position of chassis switches 104 and a plurality of port extenders in the position of TOR switches 106, interconnected as shown in interconnected topology 118.

In this manner, network 100 represents an example of a data center network including a first set of one or more server devices of the data center, the first set of server devices hosting data of a first tenant of the data center; a first network device of an interconnected topology communicatively coupled to the first set of one or more server devices, the first network device including a first service virtual routing and forwarding (VRF) table for the first set of server devices; a second set of one or more server devices of the data center, the second set of server devices hosting data of a second tenant of the data center; a second network device of the interconnected topology communicatively coupled to the second set of one or more server devices, the second leaf node device including a second VRF table for the second set of server devices; and one or more service devices that communicatively couple the first network device to the second network device, wherein the service devices include a third service VRF table for the first tenant and a fourth service VRF table for the second tenant, wherein the first network device applies the first service VRF table to network traffic flowing between the first set of server devices and the second set of server devices, wherein the second network device applies the second service VRF table to the network traffic flowing between the first set of server devices and the second set of server devices, and wherein the service devices apply services to the network traffic flowing between the first set of server devices and the second set of server devices using the third service VRF table and the fourth service VRF table.

FIG. 2 is a block diagram illustrating an example Clos network 130. Clos network 130, or a similar Clos network, generally represents one example layout for interconnected topology 118 of FIG. 1. In this example, clos network 130 includes three stages of switches: ingress switches 132A-132N (ingress switches 132), mid-stage switches 134A-134N (mid-stage switches 134), and egress switches 136A-136N (egress switches 136). Although the letter "N" is used to designate a variable number for each of ingress switches 132, mid-stage switches 134, and egress switches 136, it should be understood that the number of switches included in each stage is not necessarily the same. That is, there may be different numbers of ingress switches 132, mid-stage switches 134, and egress switches 136. Furthermore, although Clos network 130 includes three stages, it should be understood that a general Clos network may include any number of stages.

Further, in some examples, the techniques described herein may be used to automatically generate and deploy policies to integrated routing and bridging (IRB) interfaces of VRFs 135A, 135B to control inter-tenant traffic flow through PNF(s) 137 in the forwarding path of the data center as traffic flows between two or more tenants. For example, a virtual network controller may operate according to the techniques described herein to automatically configure switch 134 (e.g., by generating configuration information/configuration data to cause such policies to be installed) such that traffic flowing into one of VRFs 135A, 135B for virtual networks 133A, 133B may be directed from the VRF to PNF 137 for application of network services prior to flowing into the other virtual network and returning to switch 134A.

These techniques may simplify the architecture of devices and the network of the data center, as it may extend constructs and configurations already widely used in data center IP-Clos networks using, e.g., Ethernet VPN Virtual Extensible LAN (EVPN VxLAN), to apply for inter-tenant service chaining through any generic PNF. This architecture also allows a software defined network (SDN) controller to automate the configuration of inter-tenant service chaining, without requiring any manual intervention, e.g., manual entry of commands via command line interface (CLI).

Figure 3:
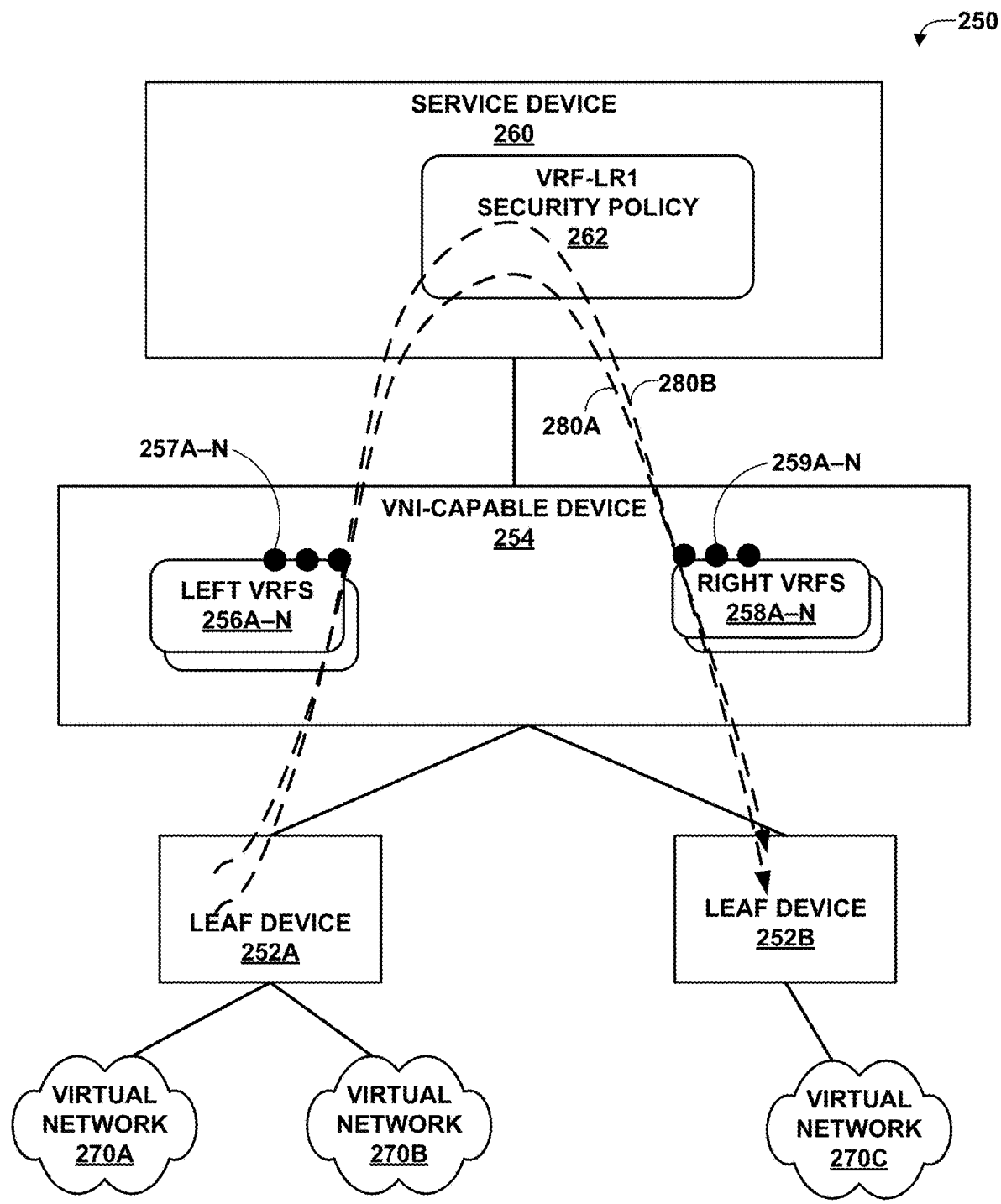
FIG. 3 is a block diagram illustrating an example system including another example set of devices of a data center that may perform the techniques of this disclosure.

FIG. 3 is a block diagram illustrating an example system 250 including another example set of devices of a data center that may perform the techniques of this disclosure. In this example, system 250 includes leaf devices 252A, 252B, Virtual Extensible LAN (VxLAN) Network Identifier (VNI)-capable device 254, and service device 260. Leaf device 252A is coupled to virtual networks 270A, 270B, while leaf device 252B is coupled to virtual network 270C. VNI-capable device 254 may correspond to a TOR switch or a spine switch, e.g., one of TOR switches 106 or chassis switches 104 of FIG. 1 or any of switches 132, 134, 136 of FIG. 2. Leaf devices 252 may correspond to, for example, servers 108 of FIG. 1.

As noted above with respect to FIG. 3, in some examples, a service device may be separate from a Layer 3 VNI capable device. In the example of FIG. 3, service device 260 is separate from VNI-capable device 254. Service device 260 may represent one of a plurality of service devices (e.g., PNF 137 shown in FIG. 2), and VNI-capable device 254 may represent one of a plurality of VNI-capable devices (e.g., mid-stage switch 134A of FIG. 2). Moreover, the plurality of service devices may be communicatively coupled to the plurality of VNI-capable devices in active-active mode.

In general, leaf device 252A and virtual networks 270A, 270B correspond to one tenant, while leaf device 252B and virtual network 270C correspond to a different tenant. Each of virtual networks 270 spawns one or more virtual machines on an individual-tenant basis. Leaf device 252A may send packet flows 280A and 280B to leaf device 252B, and thus, packet 280A represents an example of an inter-tenant network communication. In some examples, the tenants may be different cloud service providers. Packet flows 280A and 280B may conform to different communication protocols. In one example, packet flow 280A represents a unicast packet flow and packet flow 280B represents a multicast (e.g., PIM) packet flow.

In accordance with the techniques of this disclosure, VNI-capable device 254 is configured with left VRF tables 256A-256N ("left VRF tables 256") for leaf device 252A (and other leaf devices on the ingress side) and right VRF tables 258 A-258N ("right VRF tables 258") for leaf device 252B (and other leaf devices on the egress side). Left VRF tables 256 and right VRF tables 258 represent examples of service VRFs that are distinct VRFs from tenant VRFs (not shown). When VNI-capable device 254 receives packet flow 280A, VNI-capable device 254 performs a lookup in the pertinent left VRF tables 256, and determines that packet flow 280A is to be sent to service device 260 to have one or more PNFs applied. Service device 260 may then perform the one or more PNFs on packets of packet flow 280A. VRF-LR1 and security policy 262 of service device 260 may define one or more security policies for a firewall PNF, for example. Left VRFs 256 and right VRFs 258 can represent several sets of varying numbers, depending on scale of VNI-capable device 254.

Service device 260 may then send packet flow 280A back to VNI-capable device 254 per a lookup in VRF-LR1 security policy 262, assuming packet flow 280A does not match any elements of a security policy of VRF-LR1 security policy 262 indicating that packet 280 is to be dropped. VNI-capable device 254 receives packet flow 280A from security device 260 and performs a lookup in right VRF table 258. Right VRF table 258 indicates that packet flow 280A is to be sent to leaf device 252B, and thus, VNI-capable device 254 forwards packet flow 280A to leaf device 252B. VNI-capable device 254 may perform similar processing of packet flow 280B, but in the context of a different communications protocol.

In some examples, an SDN controller (not shown) of system 250 (e.g., corresponding to virtual network controller 112 of FIG. 1) is configured to receive data from an administrator (e.g., administrator 110 of FIG. 1) representing whether to use BGP between VNI-capable device 254 and service device 260 (including a PNF routing instance) or to configure static routes to divert traffic from VNI-capable device 254 to service device 260. In some examples, additionally or alternatively, the SDN controller is configured to receive data from the administrator representing whether the pertinent service left VRF table 256 and right VRF table 258 are shared with logical router VRF tables of, e.g., leaf devices 252. In general, the SDN controller may further configure the various devices of system 250 according to the discussion above. For example, the SDN controller may receive high-level configuration data for the various devices, and translate the high level configuration data to low-level (that is, device-level) configuration data that can be implemented on VNI-capable device 254.

Further details of examples of configuration of the devices of system 250 are discussed in "contrail-specs/5.1/cfm-lepnf-support.md," 12 Nov. 2018, available at github.com/Juniper/contrail-specs/blob/master/5.1/cfm-13-pnf-support.md, which is incorporated herein by reference in its entirety. Aspects of this disclosure provide the functionalities enumerated in the remainder of this paragraph. With respect to Virtual Network and LRs, users have the option to configure either anycast IP or individual IP4 address in the IRB unit through a user interface, as well as whether to configure a routing protocol session and BFD session. Other functionalities include the configuration of individual IPv4 addresses to IRB unit though the user interface, static route setting via the user interface, and EBGP with BFD support.

Aspects of this this disclosure also enable users to select from options to configure OSPF and PIM (multicast) on the IRB interface on the non-anycast IP address. Aspects of this disclosure also enable users to run e-BGP protocol on the loopback address within the VRF with respect to the Virtual Network and/or LRs. According to these aspects of this disclosure, users have the options to configure OSPF and PIM (multicast) on the IRB interface on the non-anycast IP address, and in some examples, to run e-BGP protocol on the loopback address within VRF. These aspects of this disclosure enable one or more of configurations of a static route with BFD support, of OSPF with BFD support, of PIM with BFD support, of individual IPv4 loopback address within a VRF, or the capability to run eBGP with BFD support on loopback IP address within VRF.

In some examples, service device 260 represents an "unmanaged" device, in that service device 260 is managed by a third party to the entity that manages the switch fabric of interconnected topology 118. In various examples, service device 260 may provide a load balancer PNF, a firewall PNF, or any other third party-provided PNF. In some examples, service device 260 may represent an unmanaged device that provides virtual network functions (VNFs) with respect to the spine and/or leaf switches of interconnected topology 118.

Virtual network controller 112 is configured according to aspects of this disclosure to provide a one-stop solution for configuring IRB units 257, 259 of VRFs 256, 258 to steer traffic through service device 260 for PNF/VNF services in a way that is agnostic to the identity of the third party that manages service device 260. By configuring the packet forwarding functionalities of IRB units 257, 259 in this way, virtual network controller 112 enables inter-tenant traffic to exit the switch fabric of interconnected topology 118, be processed by the unmanaged PNF and/or VNF, and reenter the switch fabric of interconnected topology 118 for L2 switching and L3 routing. In this way, virtual network controller 112 implements the techniques of this disclosure to provide a standard way of connecting any unmanaged (i.e. third party-managed) device in a substantially plug-and-play manner to the switch fabric of interconnected topology 118 for PNF and/or VNF processing.

Virtual network controller implements the techniques of this disclosure to configure IRB units 257 and IRB units 259 of VRFs 256, 258 to shunt packet flows 280A, 280B through service device 260, which represents an unmanaged device in the context of interconnected topology 118. An LR on the switch fabric of interconnected topology 118 represents a VRF on VNI-capable device 254. As such, each LR running on the switch fabric maps to a single VRF running on VNI-capable device 254. By placing tenant VNs and routed VNs in the same LR, packet flows 280A and 280B may traverse the switch fabric of interconnected topology 118, exiting to service device 260 and reentering the switch fabric, with their own respective IRB units. The direction of the routed VN is towards service device 260.

Routing protocols are run on IRB units 257, 259, for routes that can direct tenant traffic to service device 260, and for routes that egress from service device 260 onto the switch fabric of interconnected topology 118. Virtual network controller 112 automates these configuration operations. In the case of service device 260 providing a multi-homed PNF, virtual network controller 112 may set up routing protocols on IRB units 257, 259 to serve different configurations, such as active-active topologies, etc. Virtual network controller 112 pushes configuration information to the switch fabric to enable configuration to occur entirely in the context of the VRF in which the tenant VNs and the routed VNs are present, with the routed VNs being towards the unmanaged service device 260.

According to the techniques of this disclosure, the switch fabric of interconnected topology 118 uses underlying protocols (OSPF, eBGP, PIM, etc.) to drive the physical underlay network, while providing a management party-agnostic way to configure packet forwarding while these protocols are used. For example, virtual network controller 112 may model any unmanaged device (service device 260 in this example) as a virtual port group (VPG) construct. In general, a VPG represents any logical grouping of physical ports. Using the techniques of this disclosure, virtual network controller 112 may model any unmanaged device (e.g., service device 260 or any other unmanaged device) as a VPG construct. For instance, based on input data received from administrator 110, virtual network controller 112 may abstractly define a physical port from a VLAN that goes from VNI-capable device 254 or from one of leaf devices 252 to the service device 260, and cause the physical port to be automatically provisioned on the side of the switch fabric of interconnected topology 118.

Again, virtual networks 270 are tenant networks, and may represent subnets of any type. Virtual network controller 112 enables administrator 110 or other end user to provide an anycast IP (e.g., any individual IP address to set routing parameters), and run any of several routing protocols to route traffic to the respective destination over the switch fabric of interconnected topology 118. Virtual network controller 112 enables this anycast IP-based routing configuration while the underlay network runs any of several protocols, such as OSPF, static routing, eBGP, BFD, PIM, etc. Depending on whether service device 260 supports each of these protocols, the switch fabric of interconnected topology 118 may run one, some, or all of these protocols in conjunction, if and when needed.

Multiple tenant virtual networks of virtual networks 270 can be clubbed into one logical router (LR), such as a LR implemented by any of leaf devices 252. Virtual network controller 112 implements the techniques of this disclosure to enable inter-tenant routing using different VN groupings implemented in different LRs, using inter-LR communications. While disparate LRs communicate over the EVPN VxLAN infrastructure of interconnected topology 118 using one or more of the various underlying routing protocols, virtual network controller 112 is configured according to aspects of this disclosure to abstract those protocols and package the communications to enable unicast and/or multicast communication in inter-tenant fashion. In various examples, virtual network controller 112 may route all unicast traffic, all multicast traffic, etc. in a protocol-selective manner. In this way, virtual network controller 112 may effectuate unicast and/or multicast traffic forwarding using a one-size-fits-all, device agnostic input or configuration input. Virtual network controller 112 may elicit the configuration input using an interactive graphical user interface (GUI), as described in greater detail below.

By configuring packet forwarding over interconnected topology 118 in this way, virtual network controller 112 implements the techniques of this disclosure to enable administrator 110 to provide configuration information for packet flows communicated over a point-to-point protocol as well as for packet flows communicated over a multi-hop protocol, while maintaining the configuration information within packet flows that conform to a specified or selected protocol.

Virtual network controller 112 configures the LRs interfaces necessary to route traffic through service device 260 in order to connect service device 260 in an automated way, in accordance with aspects of this disclosure. That is, virtual controller 112 installs the configuration data in the LRs implemented within interconnected topology. For every inter-tenant routing instance, virtual network controller 112 sets up an IRB interface. Thereby, for every VN of interconnected topology that needs to perform routing, the LR is set up with different IRB units along with the corresponding routed VN that is directed towards (or "faces") service device 260, with the IRB units running the routing protocol. Because tenant traffic is on the same VRF as the routed VN traffic, the tenant traffic also gets routed to service device 260.

As such, virtual network controller 112 deploys (e.g., installs) configuration data to implement IRB bridging across the pertinent chain of devices of interconnected topology 118, with service device 260 representing the next hop in the configuration. Traffic is steered out of interconnected topology 118 to service device 260 and back into interconnected topology 118, with the correct routes being installed in the IRB configuration to steer traffic through service device 260 as it flows out and back into the switch fabric. The configuration supports multiple protocols by setting up an abstraction layer for intermediate communications. The solutions provided by virtual network controller 112 are portable, in that the same configuration techniques can be reused for any unmanaged device being connected to an edge device of the existing switch fabric of interconnected topology 118.

FIGS. 4-9 are screenshots illustrating an example user interface presented by virtual network controller 112 in accordance with the techniques described herein.

Figure 4:
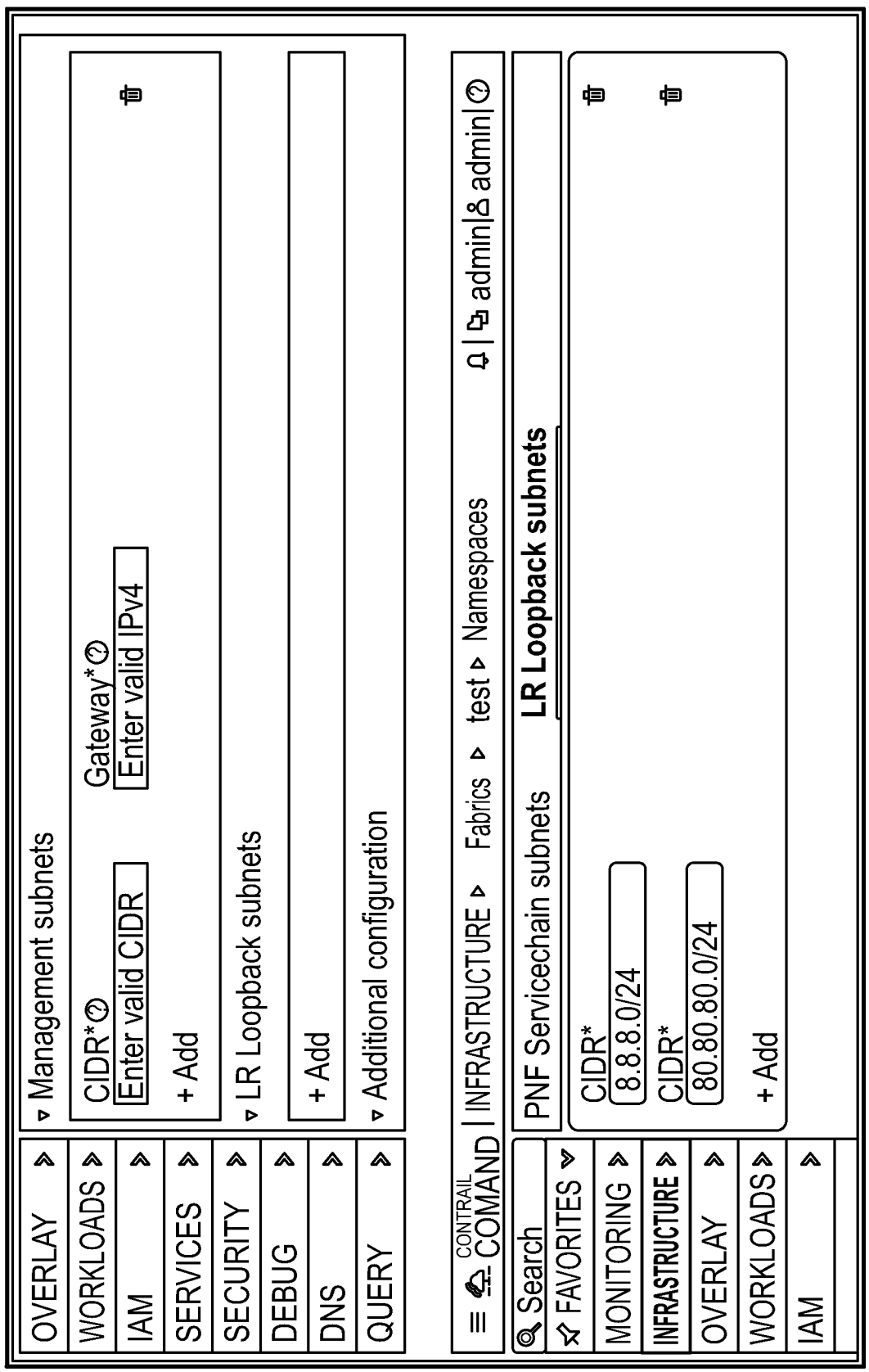
FIG. 4 is a screenshot illustrating an interactive GUI that an administrator may operate to allocate and/or define an IPv4 loopback IP within a VRF.

FIG. 4 is a screenshot illustrating an interactive GUI of virtual network controller 112 that administrator 110 may operate to allocate and/or define an IPv4 loopback IP within a VRF. As used herein, a "loopback IP" refers to an IP address that can be used to uniquely identify a particular device deployed at data center 102. Virtual network controller 112 provides the loopback IP received via the interactive GUI to one or more of TOR switches 106 and/or one or more of chassis switches 104, enabling these devices to create the switch fabric of interconnected topology 118 by ingesting and processing unique device-identifying IP address information for L2 switching and L3 routing.

Based on the selection input by the user, virtual network controller 112 may allocate an IP address based on user-defined subnet(s). For example, as part of the fabric creation stage of interconnected topology 118, virtual network controller 112 may identify the loopback subnet for each of virtual networks 252 based on the loopback IP received via the interactive GUI of FIG. 4. In the example of FIG. 4, the UI presents the user with two options by which to provide this LR loopback subnets. The first option shown in FIG. 4 is during fabric onboarding, which is described above with respect to loopback subnet identification during switch fabric creation for interconnected topology 118. The second option shown in FIG. 4 is after the switching fabric has been onboarded, via user input in the "Fabric Namespaces" section.

FIG. 5 is a screenshot illustrating a UI-based functionality directing virtual network controller 112 to automatically enable default, internally routed virtual network creation when a LR loopback subnet is defined. In this example, each of virtual networks 252 represents a respective "tenant virtual network (VN)," and the overall interconnected network between these tenant VNs is referred to herein as a "routed VN." By providing input via the interactive GUI of FIG. 5, administrator 110 may cause virtual network controller 112 to automatically generate the default internal routed VN. Virtual network controller 112 may add each routed VN to one or more LRs, such as to each LR in the particular set of LRs that participate in the routed VN based on their hosting of participating tenant VN(s). For example, administrator 110 may provide an IP address via the interactive GUI of FIG. 5. As another example, administrator 110 may leave the IP address field blank, and virtual network controller 112 may provide an IP address from the administrator-defined LR loopback subnets. In any event, the LRs of a routed VN can be extended to any device of the switch fabric of interconnected topology 118.

FIG. 6 is a screenshot illustrating an example of LR loopback functionalities provided via the interactive GUIs of virtual network controller 112 in accordance with this disclosure. Once the LRs are extended to the physical devices of the switch fabric, virtual network controller 112 may update the GUI to request protocol information for the inter-tenant communication session being provisioned. Protocol options include eBGP, OSPF, PIM, static route, etc. Virtual network controller 112 may also request certain parameters, such as the local IP address to which a BGP session is directed, the peer information for the session, an ASN value, etc. Virtual network controller 112 may also import or export enhanced routing policy information for the protocol session, BFD setup for session downtime detection, etc.

In the particular use case scenario captured in the screenshot of FIG. 6, the LR loopback routed VN setup screen includes fields such as a loopback IP address and eBGP with BFD. Using the LR loopback routed VN field, administrator 110 can provide an IP address. If the LR loopback routed VN is left blank, virtual network controller 112 may generate an IP address from previously defined LR subnets. Using the eBGP with BFD field shown in FIG. 6, administrator 110 may provide BGP info. As such, FIG. 6 illustrates a user-facing mechanism by which virtual network controller 112 may provision an eBGP session for inter-tenant communications with the ability to integrate one or more unmanaged devices seamlessly for PNF and/or VNF.

Presented below is an example script that virtual network controller 112 may push to one or more of the devices of interconnected topology 118 (e.g., a switch) to as configuration information to cause the device(s) to automatically provision an eBGP session to implement the LR loopback functionalities of this disclosure:

set routing-instances_contrail_LRx_4821bc16-459e-40ad-83c3-4979e9930639 interface lo0.1028
    set routing-instances_contrail_LRx_4821bc16-459e-40ad-83c3-4979e9930639 protocols bgp group test-overlay-loopback-network bgp type external
    set routing-instances_contrail_LRx_4821bc16-459e-40ad-83c3-4979e9930639 protocols bgp group test-overlay-loopback-network bgp multihop ttl 10
    set routing-instances_contrail_LRx_4821bc16-459e-40ad-83c3-4979e9930639 protocols bgp group test-overlay-loopback-network bgp local-address 8.8.8.8
    set routing-instances_contrail_LRx_4821bc16-459e-40ad-83c3-4979e9930639 protocols bgp group test-overlay-loopback-network_bgp authentication-key "$9$.mz6pu1hyKBI7-bwg4z3n"
    set routing-instances_contrail_LRx_4821bc16-459e-40ad-83c3-4979e9930639 protocols bgp group test-overlay-loopback-network_bgp export OSPF-2-BGP
    set routing-instances_contrail_LRx_4821bc16-459e-40ad-83c3-4979e9930639 protocols bgp group test-overlay-loopback-network_bgp local-as 64512
    set routing-instances_contrail_LRx_4821bc16-459e-40ad-83c3-4979e9930639 protocols bgp group test-overlay-loopback-network_bgp local-as loops 2
    set routing-instances_contrail_LRx_4821bc16-459e-40ad-83c3-4979e9930639 protocols bgp group test-overlay-loopback-network_bgp multipath
    set routing-instances_contrail_LRx_4821bc16-459e-40ad-83c3-4979e9930639 protocols bgp group test-overlay-loopback-network_bgp neighbor 10.10.10.1 peer-as 12345
set interfaces lo0 unit 1028 family inet address 8.8.8.8/32

Figure 7:
FIG. 7 is a screenshot illustrating interactive UI-driven OSPF configuration capabilities provided by a virtual network controller of this disclosure in accordance with aspects of this disclosure.

FIG. 7 is a screenshot illustrating interactive UI-driven OSPF configuration capabilities provided by virtual network controller 112 in accordance with aspects of this disclosure. With OSPF being the standard protocol for underlay network communications, virtual network controller 112 supports configuration input for all areas, including the stub areas, backbone areas, regular areas, NSSA, hello interval, dead interval. Virtual network controller 112 also enables enhance routing policy import/export, authentication key, BFD, etc. According to the techniques of this disclosure, virtual network controller 112 may use one or more of the parameters received via the interactive GUI of FIG. 7 to set up an inter-tenant OSPF session over the switch fabric of data center 102 with the ability to seamlessly integrate unmanaged device(s) for PNF and/or VNF. In the example of FIG. 7, the following example fields are supported through the illustrated interactive GUI for OSPF routing protocol:

Area ID: Represented in format x.x.x.x
    AreaType: Regular Area, NSSA area and STUB area.
    if Area ID is 0, it is Backbone area. All three areas define above would be greyed out in the UI.
    if Area ID is not 0. It can be NSSA or STUB if selected in UI, otherwise Regular Area.
    Hello Interval: In seconds
    Dead Interval: In seconds
    Import/Export Policies: Select Policies defined under Routing policies
    MD5 Authentication: MD5 Authentication Key
    Redistribute loopback: To advertise loopback interface defined in VRF.
    Originate Summary LSA: If enabled flood LSA summary into area.
    BFD interval, multiplier: BFD for this OSPF session.

Presented below is an example script that virtual network controller 112 may generate and deploy to one or more switches to automatically configure the OSPF configuration support, where the switches may, for example, be used as one or more of TOR switches 106 or chassis switches 104) is presented below:

set routing-instances_contrail_LRx_4821bc16-459e-40ad-83c3-4979e9930639 protocols ospf export OSPF-EXPORT
    set routing-instances_contrail_LRx_4821bc16-459e-40ad-83c3-4979e9930639 protocols ospf export OSPF-3
    set routing-instances_contrail_LRx_4821bc16-459e-40ad-83c3-4979e9930639 protocols ospf export OSPF-2
    set routing-instances_contrail_LRx_4821bc16-459e-40ad-83c3-4979e9930639 protocols ospf import dummy
    set routing-instances_contrail_LRx_4821bc16-459e-40ad-83c3-4979e9930639 protocols ospf area 0.0.0.0 interface lo0.1028 passive
    set routing-instances_contrail_LRx_4821bc16-459e-40ad-83c3-4979e9930639 protocols ospf area 0.0.0.0 interface irb.22 interface-type p2p
    set routing-instances_contrail_LRx_4821bc16-459e-40ad-83c3-4979e9930639 protocols ospf area 0.0.0.0 interface irb.22 hello-interval 10
    set routing-instances_contrail_LRx_4821bc16-459e-40ad-83c3-4979e9930639 protocols ospf area 0.0.0.0 interface irb.22 dead-interval 40
    set routing-instances_contrail_LRx_4821bc16-459e-40ad-83c3-4979e9930639 protocols ospf area 0.0.0.0 interface irb.22 authentication md5 5 key "$9$o4ajqTQnCpB36ylvMXxjHk"
    set routing-instances_contrail_LRx_4821bc16-459e-40ad-83c3-4979e9930639 protocols ospf area 0.0.0.0 interface irb.22 bfd-liveness-detection minimum-interval 3500
    set routing-instances_contrail_LRx_4821bc16-459e-40ad-83c3-4979e9930639 protocols ospf area 0.0.0.0 interface irb.22 bfd-liveness-detection multiplier 3

Figure 8:
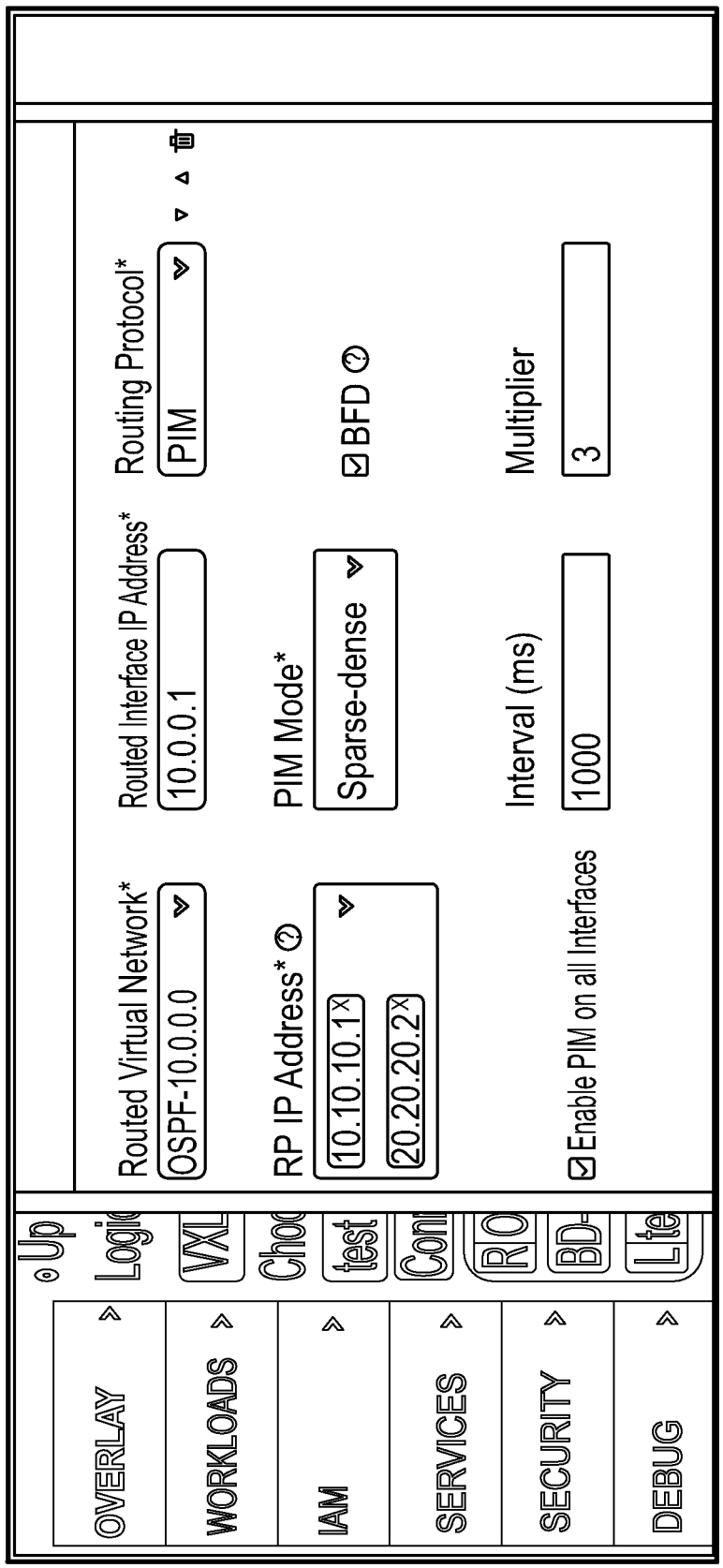
FIG. 8 is a screenshot illustrating UI-driven support of configuring a switch fabric for PIM (with BFD) communications, according to aspects of this disclosure.

FIG. 8 is a screenshot illustrating UI-driven support of configuring a switch fabric for PIM (with BFD) communications, according to aspects of this disclosure. The GUI shown in FIG. 8 enables administrator 110 to set PIM enablement status (on or off) for various interfaces of the devices of the switch fabric. The RP IP address uniquely identifies a device, such as an unmanaged device (e.g., service device 260 in some instances) or a PIM rendezvous point, etc. The interactive GUI of FIG. 8 also enables virtual network controller 112 to accept user input setting the PIM mode for the session, and BFD enablement status as well.

As such, FIG. 8 illustrates support for a multicast (in this case, PIM) protocol in accordance with aspects of this disclosure. Virtual network controller 112 may enable PIM with BFD for routed virtual networks, using configuration information received via the interactive UI of FIG. 8. As shown in FIG. 8, the PIM with BFD configuration interface of this disclosure supports the following fields:

RP address: List of RP addresses is supported.
    Mode: Sparse-dense by default.

Enable PIM on all interfaces: If not checked PIM would be enabled on "irb.x" created in VRF by this routed VN. If enabled PIM config would be applicable to all irb's for this VRF.

BFD: User defined BFD info for PIM

Presented below is an example of configuration information in the form of a script that virtual network controller 112 may push and cause to be executed on one or more switching devices of a the switch fabric to enable the PIM protocol (with BFD in this example), in accordance with this disclosure:

set routing-instances_contrail_LRx_4821bc16-459e-40ad-83c3-4979e9930639 protocols pim rp static address 10.10.10.1
    set routing-instances_contrail_LRx_4821bc16-459e-40ad-83c3-4979e9930639 protocols pim rp static address 20.20.20.2
    set routing-instances_contrail_LRx_4821bc16-459e-40ad-83c3-4979e9930639 protocols pim interface all family inet bfd-liveness-detection minimum-interval 1000
    set routing-instances_contrail_LRx_4821bc16-459e-40ad-83c3-4979e9930639 protocols pim interface all family inet bfd-liveness-detection multiplier 3
    set routing-instances_contrail_LRx_4821bc16-459e-40ad-83c3-4979e9930639 protocols pim interface all mode sparse-dense
      set protocols igmp interface irb.26
      set protocols igmp interface irb.25
      set protocols igmp interface irb.22
      set protocols igmp interface irb.23
      set protocols igmp interface irb.27
      set protocols igmp-snooping vlan bd-22 interface xe-0/0/24:0.0

In this way, virtual network controller 112 automates the setup of IRB units on switching devices to steer traffic of multiple protocols through an unmanaged device (e.g., service device 260 in instances in which service device 260 is managed by a third party to the entity managing interconnected topology 118) that provides PNF and/or VNF without requiring static routes, and while enabling the protocols being defined. Some devices support particular protocols. The techniques of this disclosure enable virtual network controller 112 to support the specific protocol(s) in plug-and-play fashion even if interconnected topology 118 represents a legacy network. The rendezvous point for PIM can be located at various physical or logical locations, and in some cases, service device 260 may itself serve as a PIM rendezvous point (although it will be appreciated that service device 260 need not serve as the PIM rendezvous point in all use case scenarios). While shown as being directly coupled to a spine switch in FIG. 4, it will be appreciated that service device 260 can, in other examples, be directly coupled to a leaf device. As such, service device 260 can be coupled to any border device of interconnected topology 118, as service device 260 represents an off-fabric device with a direct connection to interconnected topology 118, configured to provide any PNF and/or VNF to interconnected topology 118.

Figure 9:
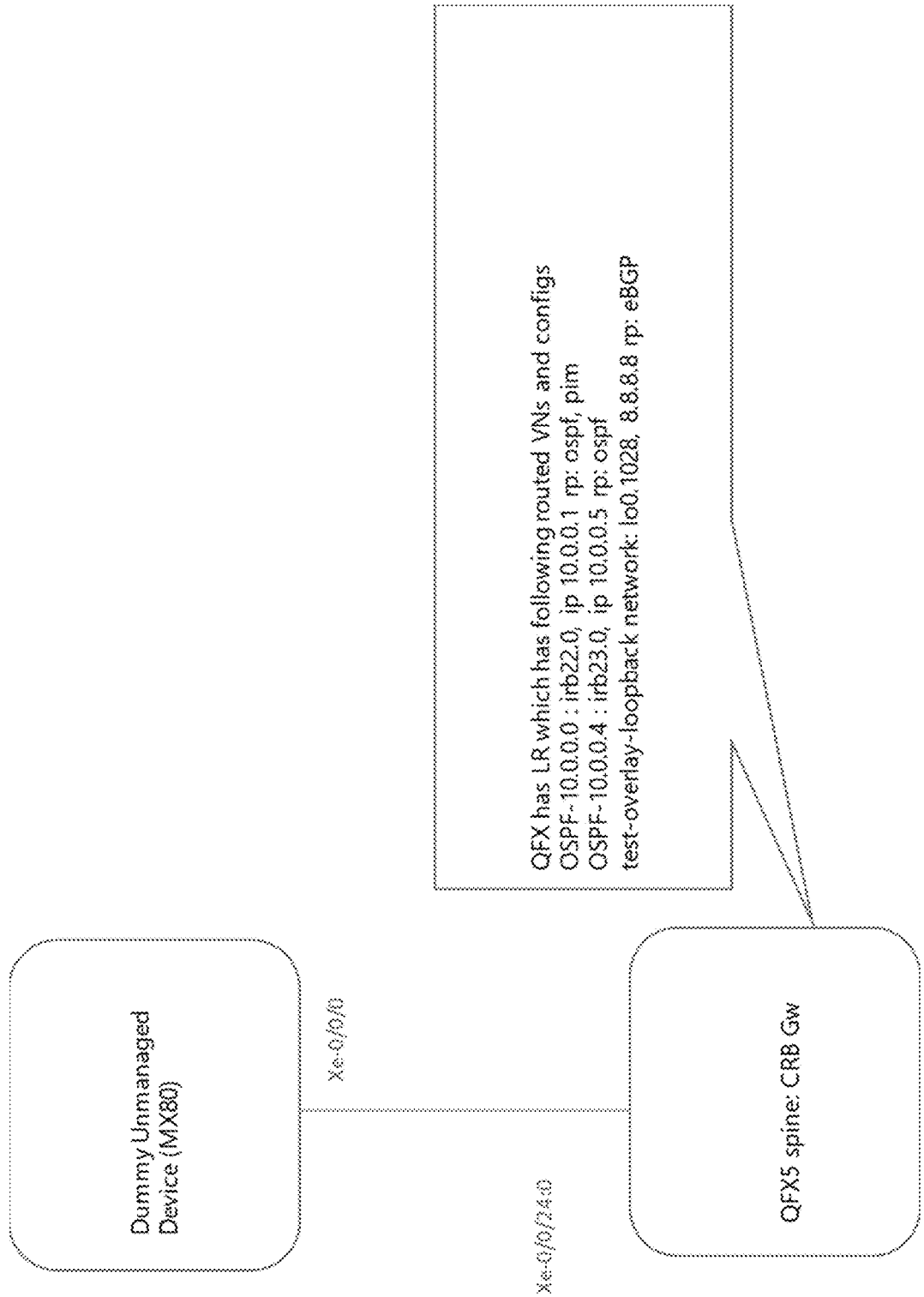
FIG. 9 is a conceptual diagram illustrating a coupling of a test (or "dummy") unmanaged device to a spine switch.
Figure 10:
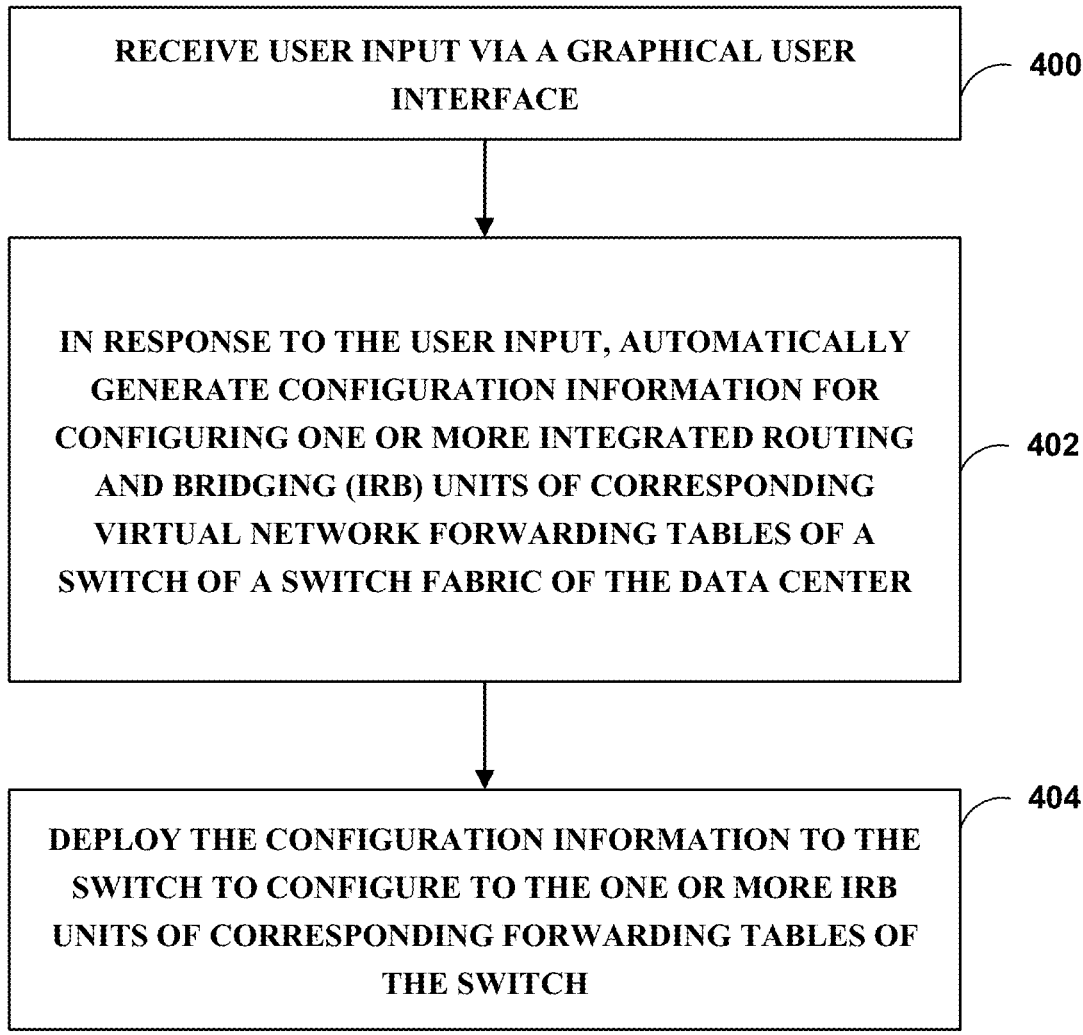
FIG. 10 is an example method for automatically generating policies and configuration data for routing traffic through physical network function (PNF) service chains in a multi-tenant data center in accordance with the techniques described herein.

FIG. 9 is a conceptual diagram illustrating a coupling of a test (or "dummy") unmanaged device to a spine switch. The OSPF configuration used to onboard the dummy unmanaged device is illustrated in FIG. 10 as a configuration that is installed to the spine switch. The spine switch used for this particular test onboarding is a QFX family switch, in accordance with various QFX family examples listed above.

FIG. 10 is an example method for automatically generating policies and configuration data for routing traffic through physical network function (PNF) service chains in a multi-tenant data center in accordance with the techniques described herein. For purposes of example, the method will be described with respect to virtual network controller 112.

Initially, virtually network controller 112 receives user input via a graphical user interface (GUI), such as the example GUIs described above (305). In some examples, the user input may specify one or more of an anycast IP address of a respective IRB unit of the one or more IRB units, an individual IPv4 address of the respective IRB unit, a routing protocol session, a bidirectional forwarding detection (BFD) session, a static route setting, an external Border Gateway Protocol (eBGP) enablement status, BFD support, or a loopback address of the respective IRB unit.

In response to the user input, virtual network controller 112 automatically generates configuration information for configuring one or more integrated routing and bridging (IRB) units of corresponding virtual network forwarding tables of a switch of a switch fabric of the data center (310). The configuration information, when deployed, causes the IRB units to direct data traffic conforming to multiple communication protocols and flowing over a plurality of virtual networks between a first set of server devices and a second set of server devices positioned outside of the switch fabric (i) toward a service device logically positioned outside of the switch fabric and coupled to the switch, and (ii) back from the service device into the switch fabric via the switch (310). The configuration may be, for example, executable scripts or, in some examples, commands that conform to a network management protocol (e.g., SNMP or NETCONF) that, when communicated to the switch, configure the forwarding tables of that device as described herein.

Virtual network controller 112 deploys the configuration information to the network switch to configure one or more IRB units of the corresponding forwarding tables of the switch according to the automatically generated configuration information (315).

EXAMPLES

Example 1: A method includes automatically generating, by a virtual network controller device of a data center network, for one or more integrated routing and bridging (IRB) units of corresponding virtual network forwarding tables of a switch of a switch fabric of the data center, configuration information that, when deployed, causes the IRB units to direct data traffic conforming to multiple communication protocols and flowing over a plurality of virtual networks between a first set of server devices and a second set of server devices positioned outside of the switch fabric (i) toward a service device logically positioned outside of the switch fabric and coupled to the switch, and (ii) back from the service device into the switch fabric via the switch; and deploying, by the virtual network controller device, the configuration information to configure the one or more IRB units of the corresponding forwarding tables of the switch according to the automatically generated configuration information.

Example 2: The method of example 1, the switch and one or more remaining switches of the switch fabric are International Organization for Standardization (ISO) Open Systems Interconnection (OSI) model Layer 3 Virtual Extensible LAN (VxLAN) Network Identifier (VNI) capable devices configured in active-active mode.

Example 3: The method of any of examples 1-2, wherein the switch is a chassis switch of the switch fabric.

Example 4: The method of any of examples 1-2, wherein the switch is a top of rack (TOR) switch of the switch fabric.

Example 6: The method of example 5, wherein the PNF or VNF comprises one of a firewall functionality or a load balancer functionality applied with respect to the data traffic.

Example 7: The method of any of examples 1-6, wherein the multiple protocols to which the data traffic conforms comprise a unicast protocol and a multicast protocol.

Example 8: The method of any of examples 1-7, further comprising receiving, a user input via a graphical user interface (GUI), wherein automatically generating the configuration information comprises automatically generating the configuration information based on the user input.

Example 9: The method of example 8, wherein the user input specifies one or more of an anycast IP address of a respective IRB unit of the one or more IRB units, an individual IPv4 address of the respective IRB unit, a routing protocol session, a bidirectional forwarding detection (BFD) session, a static route setting, an external Border Gateway Protocol (eBGP) enablement status, BFD support, or a loopback address of the respective IRB unit.

Example 10: A virtual network controller configured to perform the method of any of examples 1-9.

Example 11: A data center system comprising means for performing the method of any of examples 1-9.

Example 12: A non-transitory computer-readable storage medium encoded with instructions that, when executed, cause processing hardware to perform the method of any of examples 1-9.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

What is claimed is:

1. A method comprising:
   receiving, by a virtual network controller device of a data center network, a user input via a graphical user interface (GUI),
      wherein the user input specifies one or more of:
         a routing protocol session,
         a bidirectional forwarding detection (BFD) session,
         a static route setting,
         an external Border Gateway Protocol (eBGP) enablement status, or
         BFD support;
   automatically generating, by the virtual network controller device of the data center network, for one or more integrated routing and bridging (IRB) units of corresponding virtual network forwarding tables of a switch of a switch fabric of the data center, configuration information based on the user input,
      wherein the automatically generated configuration information, when deployed, causes the IRB units to direct data traffic conforming to multiple communication protocols and flowing over a plurality of virtual networks between a first set of server devices and a second set of server devices positioned outside of the switch fabric (i) toward a service device logically positioned outside of the switch fabric and coupled to the switch, and (ii) back from the service device into the switch fabric via the switch, and
      wherein the IRB units are configured to be agnostic when steering traffic to the service device; and
   deploying, by the virtual network controller device, the automatically generated configuration information to configure the one or more IRB units of the corresponding forwarding tables of the switch according to the automatically generated configuration information.

2. The method of claim 1, wherein the switch and one or more remaining switches of the switch fabric are International Organization for Standardization (ISO) Open Systems Interconnection (OSI) model Layer 3 Virtual Extensible LAN (VxLAN) Network Identifier (VNI) capable devices configured in active-active mode.

3. The method of claim 1, wherein the switch is a chassis switch of the switch fabric.

4. The method of claim 1, wherein the switch is a top of rack (TOR) switch of the switch fabric.

5. The method of claim 1, wherein the service device is configured to provide one or both of a physical network function (PNF) or a virtual network function (VNF) to the data traffic conforming to the multiple communication protocols and flowing between the first set of server devices and the second set of server devices positioned outside of the switch fabric.

6. The method of claim 5, wherein the PNF or VNF comprises one of a firewall functionality or a load balancer functionality applied with respect to the data traffic.

7. The method of claim 1, wherein the multiple communication protocols to which the data traffic conforms comprise a unicast protocol and a multicast protocol.

8. The method of claim 1, wherein the IRB units are configured with the multiple communication protocols to shunt communication protocol flow of the data traffic through the service device.

9. The method of claim 1, further comprising:
communicating with the data center network using an interface type,
the interface type including one or more:
a Simple Network Management Protocol (SNMP) interface,
a path computation element protocol (PCEP) interface,
a Device Management Interface (DMI),
a command line interface (CLI), or
an Interface to a Routing System (IRS).

10. A virtual network controller device of a data center network comprising:
a memory; and
one or more processors configured to:
receive a user input via a graphical user interface (GUI),
wherein the user input specifies one or more of:
a routing protocol session,
a bidirectional forwarding detection (BFD) session,
a static route setting,
an external Border Gateway Protocol (eBGP) enablement status, or
BFD support;
automatically generate, one or more integrated routing and bridging (IRB) units of corresponding virtual network forwarding tables of a switch of a switch fabric of the data center network, configuration information based on the user input,
wherein the automatically generated configuration information, when deployed, causes the IRB units to direct data traffic conforming to multiple communication protocols and flowing over a plurality of virtual networks between a first set of server devices and a second set of server devices positioned outside of the switch fabric (i) toward a service device logically positioned outside of the switch fabric and coupled to the switch, and (ii) back from the service device into the switch fabric via the switch, and
wherein the IRB units are configured to be agnostic when steering traffic to the service device; and
deploy the automatically generated configuration information to configure the one or more IRB units of the corresponding forwarding tables of the switch according to the automatically generated configuration information.

11. The network controller of claim 10, wherein the switch and one or more remaining switches of the switch fabric are International Organization for Standardization (ISO) Open Systems Interconnection (OSI) model Layer 3 Virtual Extensible LAN (VxLAN) Network Identifier (VNI) capable devices configured in active-active mode.

12. The network controller of claim 10, wherein the switch is a chassis switch of the switch fabric.

13. The network controller of claim 10, wherein the switch is a top of rack (TOR) switch of the switch fabric.

14. The network controller of claim 10, wherein the service device is configured to provide one or both of a physical network function (PNF) or a virtual network function (VNF) to the data traffic conforming to the multiple communication protocols and flowing between the first set of server devices and the second set of server devices positioned outside of the switch fabric.

15. The network controller of claim 14, wherein the PNF or VNF comprises one of a firewall functionality or a load balancer functionality applied with respect to the data traffic.

16. The network controller of claim 10, wherein the multiple communication protocols to which the data traffic conforms comprise a unicast protocol and a multicast protocol.

17. The network controller of claim 10, wherein the one or more processors are further to:
communicate with the data center network using an interface type,
the interface type including one or more:
a Simple Network Management Protocol (SNMP) interface,
a path computation element protocol (PCEP) interface,
a Device Management Interface (DMI),
a command line interface (CLI), or
an Interface to a Routing System (IRS).

18. The network controller of claim 10, wherein the IRB units are configured with the multiple communication protocols to shunt communication protocol flow of the data traffic through the service device.

19. A computer-readable storage medium storing instructions, the instructions comprising:
one or more instructions that, when executed by one or more processors of a virtual network controller of a data center network, cause the one or more processors to:
receive a user input via a graphical user interface (GUI),
wherein the user input specifies one or more of:
a routing protocol session,
a bidirectional forwarding detection (BFD) session,
a static route setting,
an external Border Gateway Protocol (eBGP) enablement status, or
BFD support;
automatically generate, for one or more integrated routing and bridging (IRB) units of corresponding virtual network forwarding tables of a switch of a switch fabric of the data center network, configuration information based on the user input,
wherein the automatically generated configuration information, when deployed, causes the IRB units to direct data traffic conforming to multiple communication protocols and flowing over a plurality of virtual networks between a first set of server devices and a second set of server devices positioned outside of the switch fabric (i) toward a service device logically positioned outside of the switch fabric and coupled to the switch, and (ii) back from the service device into the switch fabric via the switch, and
wherein the IRB units are configured to be agnostic when steering traffic to the service device; and
deploy the automatically generated configuration information to configure the one or more IRB units of the corresponding forwarding tables of the switch according to the automatically generated configuration information.

20. The computer-readable storage medium of claim 19, wherein the service device is configured to provide one or both of a physical network function (PNF) or a virtual network function (VNF) to the data traffic conforming to the multiple communication protocols and flowing between the first set of server devices and the second set of server devices positioned outside of the switch fabric.

* * * * *